United States Patent
Jiang

(10) Patent No.: US 11,029,524 B2
(45) Date of Patent: Jun. 8, 2021

(54) DISPLAY DEVICE

(71) Applicant: Beijing Xiaomi Mobile Software Co., Ltd., Beijing (CN)

(72) Inventor: Hao Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/265,474

(22) Filed: Feb. 1, 2019

(65) Prior Publication Data
US 2019/0250412 A1    Aug. 15, 2019

(30) Foreign Application Priority Data
Feb. 9, 2018    (CN) .......................... 201810135959.4

(51) Int. Cl.
| | |
|---|---|
| G02B 27/01 | (2006.01) |
| G06F 1/16 | (2006.01) |
| G06F 3/01 | (2006.01) |
| G09G 5/00 | (2006.01) |

(Continued)

(52) U.S. Cl.
CPC ......... *G02B 27/0176* (2013.01); *G06F 1/163* (2013.01); *G06F 3/011* (2013.01); *G09G 5/006* (2013.01); *H04R 1/1091* (2013.01); *G02B 2027/014* (2013.01); *G02B 2027/015* (2013.01); *G02B 2027/0138* (2013.01);

(Continued)

(58) Field of Classification Search
CPC ........ G02B 27/0176; G02B 2027/0138; G02B 2027/014; G02B 2027/015; G02B 2027/0161; G02B 2027/0169; G02B 2027/0178; G06F 1/163; G06F 3/011; G06F 2203/012; G09G 5/006; G09G 2354/00; G09G 2370/16; H04R 1/1091; H04R 2420/07; G02C 11/10
See application file for complete search history.

(56) References Cited

U.S. PATENT DOCUMENTS

| | | | |
|---|---|---|---|
| 10,061,352 B1 * | 8/2018 | Trail | ....................... G06F 3/167 |
| 2008/0144854 A1 * | 6/2008 | Abreu | .................... G02C 3/003 |
| | | | 381/74 |

(Continued)

FOREIGN PATENT DOCUMENTS

| | | |
|---|---|---|
| CN | 104951065 A | 9/2015 |
| EP | 2 942 931 A1 | 11/2015 |

(Continued)

OTHER PUBLICATIONS

International Search Report dated Nov. 12, 2018, in counterpart International Application No. PCT/CN2018/095900.

(Continued)

*Primary Examiner* — Stacy Khoo
(74) *Attorney, Agent, or Firm* — Finnegan, Henderson, Farabow, Garrett & Dunner, L.L.P.

(57) ABSTRACT

The present disclosure relates to a display device, including an optical imaging assembly and a neck wearable assembly. The optical imaging assembly is mounted on a head-mounted assembly, and is configured to present a virtual image to a user when the user wears the head-mounted assembly on the user's head. The neck wearable assembly is wearable on the user's neck, and is configured to obtain the virtual image and provide the virtual image to the optical imaging assembly for presenting.

19 Claims, 7 Drawing Sheets

(51) Int. Cl.
   *H04R 1/10* (2006.01)
   *G02C 11/00* (2006.01)
(52) U.S. Cl.
   CPC .............. *G02B 2027/0161* (2013.01); *G02B 2027/0169* (2013.01); *G02B 2027/0178* (2013.01); *G02C 11/10* (2013.01); *G09G 2354/00* (2013.01); *G09G 2370/16* (2013.01); *H04R 2420/07* (2013.01)

(56) References Cited

U.S. PATENT DOCUMENTS

| 2008/0169998 | A1 | 7/2008 | Jacobsen et al. |
| 2016/0070110 | A1 | 3/2016 | Ushakov |
| 2016/0223821 | A1 | 8/2016 | Seo |

FOREIGN PATENT DOCUMENTS

| EP | 3239803 A2 | 11/2017 |
| JP | 2000321995 A | 11/2000 |
| JP | 2002-229670 A | 8/2002 |
| JP | 2010-516186 A | 5/2010 |
| JP | 2010-245873 A | 10/2010 |
| JP | 2016-161934 A | 9/2016 |
| KR | 2015-0111198 A | 10/2015 |
| KR | 2016-0093318 A | 8/2016 |
| RU | 2551799 C1 | 5/2015 |

OTHER PUBLICATIONS

Extended Search Report for European Application No. 19155902.0 from the European Patent Office, dated Jun. 7, 2019.
Korean Office Action dated Jul. 31, 2020, in counterpart Korean Application No. 10-2019-7009235.
Japanese Office Action dated Jun. 2, 2020, in counterpart JP Application 2018-552038.
European Office Action dated May 19, 2020, in counterpart EP Application 19155902.0-1020.
Office Action of European Application No. 19155902.0, dated Dec. 11, 2020.

\* cited by examiner

DISPLAY DEVICE

CROSS-REFERENCE TO RELATED APPLICATIONS

This application is based on and claims priority to Chinese Patent Application No. 201810135959.4, filed with the State Intellectual Property Office of P. R. China on Feb. 9, 2018, which is incorporated herein by reference in its entirety.

TECHNICAL FIELD

The present disclosure relates to the field of image display technologies, and more particularly, to a display device.

BACKGROUND

Display devices can achieve functions such as information transmission, information interaction by presenting display content to users. Display devices in the related art generally include televisions, computers, and the like. With the continuous development of mobile technology, display devices have gradually developed into mobile terminals with small sizes and light weight, such as portable handheld devices, e.g., mobile phones and tablets.

At present, the scope of mobile terminals has been further expanded, and mobile terminals have evolved from handheld devices to wearable devices. For example, the wearable devices may include glasses-type terminals, helmet-type terminals, etc., which can be worn on the user's head.

However, when the weight of a wearable device is large, a user's center of gravity may be unstable when the user wears the wearable device, and the user may be uncomfortable after wearing the wearable device for a short period of time, which is disadvantageous for utilization of the wearable device.

SUMMARY

According to embodiments of the present disclosure, there is provided a display device. The display device includes an optical imaging assembly and a neck wearable assembly. The optical imaging assembly is mounted on a head-mounted assembly, and is configured to present a virtual image to a user when the user wears the head-mounted assembly on the user's head. The neck wearable assembly is wearable on the user's neck, and is configured to obtain the virtual image and provide the virtual image to the optical imaging assembly for presenting.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific embodiments, but should not be construed to limit the present disclosure. As used in the description of the present disclosure and the appended claims. "a" and "the" in singular forms mean including plural forms, unless clearly indicated in the context otherwise. It should also be understood that, as used herein, the term "and/or" represents and contains any one and all possible combinations of one or more associated listed items.

Figure 1:
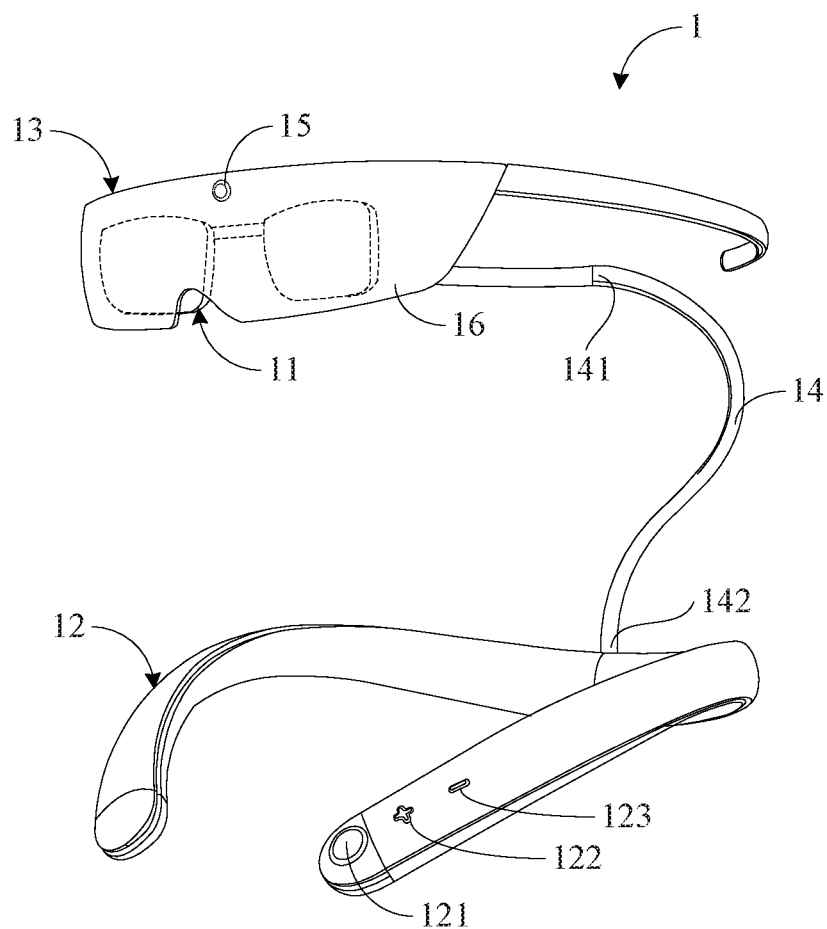
FIG. 1 is a schematic diagram illustrating a display device according to an exemplary embodiment.
Figure 2:
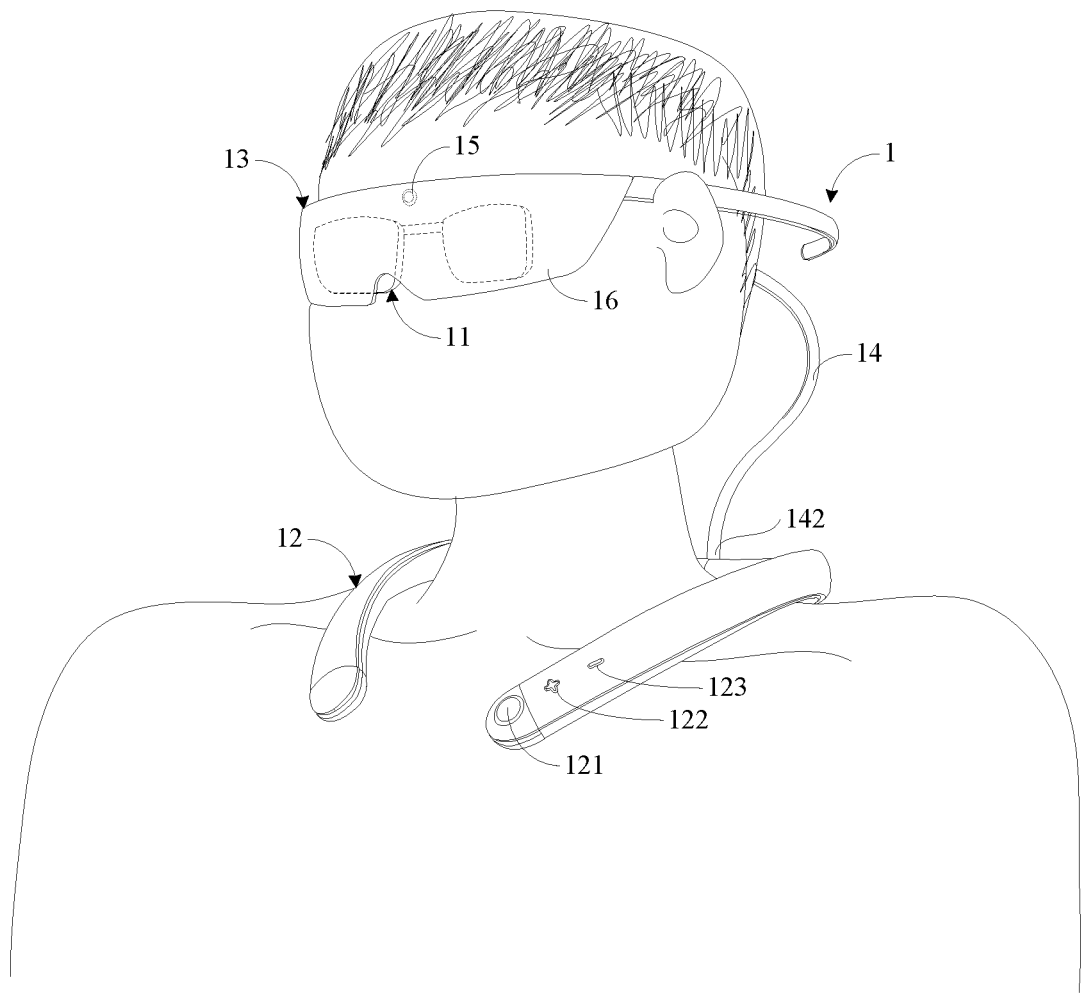
FIG. 2 is a schematic diagram illustrating a user wearing a display device according to an exemplary embodiment.

FIG. 1 is a schematic diagram illustrating a display device 1 according to an exemplary embodiment. FIG. 2 is a schematic diagram illustrating a user wearing the display device 1 according to an exemplary embodiment. As illustrated in FIGS. 1-2, the display device 1 includes an optical imaging assembly 11 and a neck wearable assembly 12. In an embodiment, the display device 1 adopts a split structure. The optical imaging assembly 11 is mounted on a head-mounted assembly 13, and when the user wears the head-mounted assembly 13 on the user's head, the optical imaging assembly 11 can present playing content to the user. The neck wearable assembly 12 can be wearable on the user's neck. Therefore, when the user wears the display device 1 of the present disclosure, part of weight of the display device 1 can be shared to the user's neck through the neck wearable assembly 12, and the weight on the user's head can be reduced. Thus, on the one hand, the user's center of gravity will not be elevated significantly and dizziness can be avoided, and on the other hand, fatigue and discomfort may not be caused even when the user wears the display device 1 for a long time.

In an embodiment, a wired connection may be available for the connection between the optical imaging assembly 11 and the neck wearable assembly 12, for example, the connection between the optical imaging assembly 11 and the neck wearable assembly 12 may be realized based on a connection line 14 illustrated in FIGS. 1-2. The connection line 14 made of a flexible material can be adapted to the user's head or neck movement, and can be helpful for storage of the display device 1. The connection line 14 may have one or more uses. For example, the connection line 14 may be used as a data connection line between the optical imaging assembly 11 and the neck wearable assembly 12, such that after the neck wearable assembly 12 obtains a virtual image, the virtual image can be transmitted to the optical imaging assembly 11 through the data connection line 14, to make the optical imaging assembly 11 to present the virtual image to the user. As another example, the connection line 14 may be used as a power connection line between the optical imaging assembly 11 and the neck wearable assembly 12. The neck wearable assembly 12 may have a main power module built therein, and the connection line 14 can be coupled to the main power module and the optical imaging assembly 11, such that the main power module can supply power to the optical imaging assembly 11 through the connection line 14. In other embodiments, the data connection line may be independent of the power connection line instead of using the connection line 14 to implement data transmission and power transmission, and embodiments of the present disclosure do not limit it.

Figure 3:
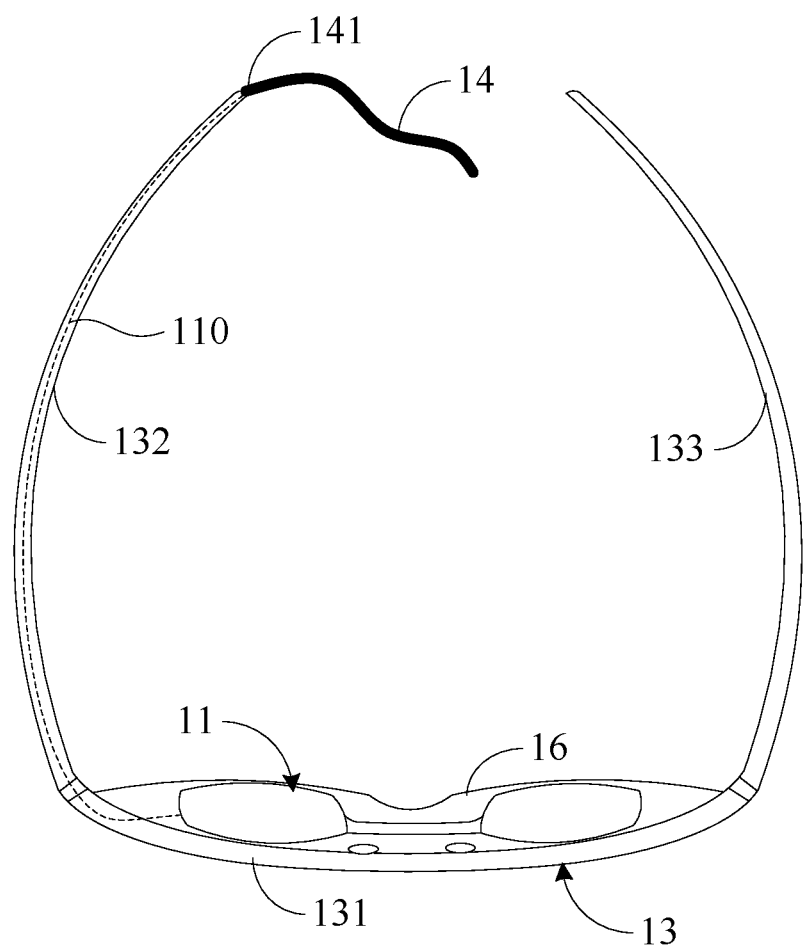
FIG. 3 is a schematic diagram illustrating an optical imaging assembly and a head-mounted assembly forming an integrated structure according to an exemplary embodiment.

In an embodiment, the optical imaging assembly 11 and the head-mounted assembly 12 illustrated in FIGS. 1-2 may form an integrated structure, such that the optical imaging assembly 11 and the head-mounted assembly 13 can be combined and merged to achieve more integrated structure and appearance. For example, FIG. 3 is a schematic diagram illustrating the optical imaging assembly 11 and the head-mounted assembly 13 forming an integrated structure according to an exemplary embodiment. As illustrated in FIG. 3, it is assumed that the head-mounted assembly 13 is a frame, which includes a lens mounting part 131, a first temple 132 and a second temple 133. The frame has a built-in transmission line 110, and when the optical imaging assembly 1 is mounted on the lens mounting part 131, the transmission line 110 extends from the lens mounting part 131 to an end of the first temple 132, so as to be coupled to a first end 141 of the connection line 14. A second end 142 of the connection line 14 is coupled to the neck wearable assembly 12, for example, in FIG. 1, the second end 142 is coupled to an intermediate point of the neck wearable assembly 12.

By coupling the first end 141 of the connection line 14 to an end of the first temple 132 and the second end 142 of the connection line 14 to the intermediate point of the neck wearable assembly 12, when the user wears the display device 1, the first end 141 is located at or near a rear part of the user's head, and the second end 142 is located at or near a rear part of the user's neck. Compared to cases that the first end 141 is away from the rear part of the user's head and the second end 142 is away from the rear part of the user's neck, when the length of the connection line 14 is constant, restriction of the connection line 14 on the user's head and neck movement can be greatly reduced, and bad feeling such as movement containment or restriction caused by the connection line 14 to the user can be reduced or eliminated.

In some embodiments, the first end 141 of the connection line 14 may not be coupled to the end of the first temple 132, and the second end 142 of the connection line 14 may not be coupled to the intermediate point of the neck wearable assembly 12, and the present disclosure does not limit it. For example, based on other connection manners, the first end 141 can still be located at or near the rear part of the user's head and the second end 142 located at or near the rear part of the user's neck, so as to improve wearing experience and use feeling of users.

Figure 4:
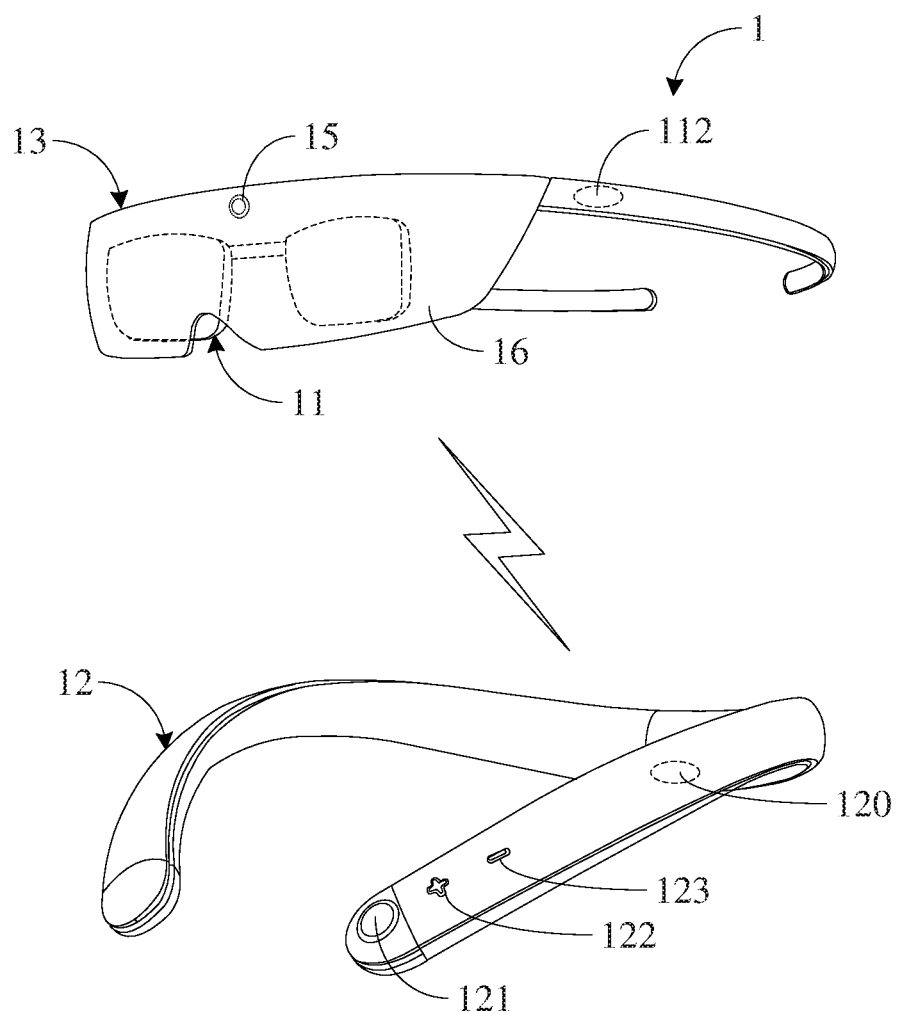
FIG. 4 is a schematic diagram illustrating a display device according to another exemplary embodiment.

In addition to the wired connection through the connection line 14, a wireless connection may also be available for the connection between the optical imaging assembly 11 and the neck wearable assembly 12. For example, FIG. 4 is a schematic diagram of the display device 1 according to another exemplary embodiment. As illustrated in FIG. 4, the optical imaging assembly 11 may include a first wireless communication module 112, the neck wearable assembly 12 may include a second wireless communication module 120, and a wireless communication connection may be established between the first wireless communication module 112 and the second wireless communication module 120, such that the optical imaging assembly 11 can obtain the virtual image obtained by the neck wearable assembly 12 through the wireless communication connection. When the optical imaging assembly 11 and the head-mounted assembly 13 forms an integrated structure, the first wireless communication module 112 may be mounted in the head-mounted assembly 13 and coupled to the optical imaging assembly 11, and other forms may be adopted in other cases, the present disclosure does not limit it. Similarly, the neck wearable assembly 12 may also wirelessly supply power to the optical imaging assembly 11. For example, the neck wearable assembly 12 may have a built-in wireless power emitting end, and the optical imaging assembly 11 may have a built-in wireless power receiving end, such that the neck wearable assembly 12 can wirelessly supply power to the optical imaging assembly 11.

In the embodiment, data transmission and power transmission may be not necessarily related, and can be regarded as two independent events, which can be processed simultaneously in some cases. For example, in embodiments illustrated in FIGS. 1-2, since wired connection is adopted, data transmission and power transmission can be achieved based on the connection line 14. As another example, in embodiments illustrated in FIG. 4, since wireless connection is adopted, data transmission and power transmission can be achieved through the wireless manner. In other embodiments, for example, when data is transmitted through the wired transmission manner, and power is transmitted through the wireless transmission manner, the connection line 14 may only be used as the data connection line. Alternatively, when the data is transmitted through the wireless transmission manner, and power is transmitted through the wired transmission manner, the connection line 14 may only be used for power transmission.

In an embodiment, the shape of the neck wearable assembly 12 may be fixed, and the shape of the neck wearable assembly 12 can be configured to fit to the user's neck curve, such that the neck wearable assembly 12 may not cause pressure or other discomfort to the user's shoulder, neck, chest or the like, user wearing experience of the neck wearable assembly 12 can be improved, and discomfort caused by the neck wearable assembly 12 can be reduced. For example, neck sample data of various users can be collected through pre-study, and through statistical analysis of the neck sample data, the neck curve meeting some or most users can be obtained, the shape of the neck wearable assembly 12 can be configured accordingly, such that the neck wearable assembly 12 can be adapted to neck conditions of some or most users. In some embodiments, due to different age groups, different genders, different ethnic groups, etc., the human body structure may vary. Therefore, various types of users can be classified in advance, and neck sample data of each type of users can be collected and analyzed to obtain the neck curve corresponding to each type of users, such that the neck wearable assembly 12 can be configured for each type of users, and users can select and use according to their actual situations.

In an embodiment, the shape of the neck wearable assembly 12 may be variable. When the neck wearable assembly 12 is wearable on the user's neck, the neck wearable assembly 12 can be adapted to the user's neck curve, such that all the users can be provided with the same neck wearable assembly 12, and the neck wearable assembly 12 can be adapted and fitted to the user's neck curve. The neck wearable assembly 12 may include internal functional components (such as a circuit board, a chip, a line) and external wrapping components. In some embodiments, it may be difficult to have all the components of the neck wearable assembly 12 made of a flexible material, and the above embodiments may be suitably modified.

Figure 5:
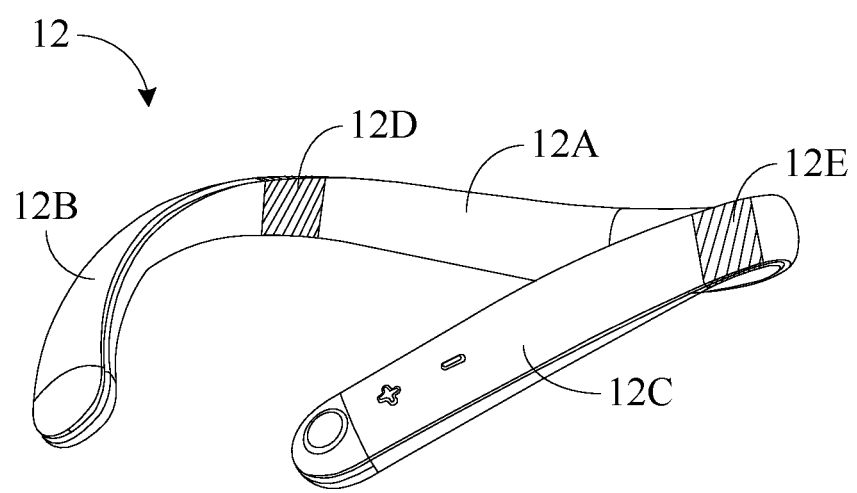
FIG. 5 is a schematic diagram illustrating a neck wearable assembly according to an exemplary embodiment.

For example, the external wrapping components may be made of the flexible material, and the internal functional components (such as the circuit board, the line) may be made of the flexible material. For hard structures, such as the chip, which cannot be made of the flexible material, integration of all hard structures together can be avoided. Different hard structures can be spatially separated from each other, and relative variation can be formed between the hard structures, such that the neck wearable assembly 12 as a whole can be adapted to the user's neck curve. FIG. 5 is a schematic diagram of the neck wearable assembly 12 according to an exemplary embodiment. As illustrated in FIG. 5, the neck wearable assembly 12 may include a rear neck part 12A, a first front part 12B, a second front part 12C, a first deformable part 12D and a second deformable part 12E. The rear neck part 12A is located at a rear part of the user's neck when the neck wearable assembly 12 is wearable on the user's neck. The first front part 12B is located at one side of the user's chest when the neck wearable assembly 12 is wearable on user's neck, for example, in FIG. 5, the first front part 12B is located at the right side of the user's chest. The second front part 12C is located at another side of the user's chest when the neck wearable assembly 12 is wearable on the user's neck, for example, in FIG. 5, the second front part 12C is located at the left side of the user's chest. The first deformable part 12D is coupled between the rear neck part 12A and the first front part 12B. The second deformable part 12E is coupled between the rear neck part 12A and the second front part 12C.

The rear neck part 12A, the first front part 12B and the second front part 12C may be configured to mount the hard structure (such as the chip) which may not be made of the flexible material. The first deformable part 12D and the second deformable part 12E may not be provided with hard structures inside, and their external wrapping structures may also be made of flexible materials, such that the first deformable part 12D and the second deformable part 12E can be adaptive to the user's neck curve, and adaptive matching of the neck wearable assembly 12 to the user's neck curve can be achieved. Accordingly, the external wrapping components of the rear neck part 12A, the first front part 12B and the second front part 12C may be made of the flexible material or the hard material, such that internal chip can be protected and sufficient structural strength can be provided, implementation of embodiments of the present disclosure will not be affected.

The neck wearable assembly 12 can obtain the virtual image corresponding to an arbitrary content and transmit it to the optical imaging assembly 11, and the optical imaging assembly 11 can present the virtual image to the user. The neck wearable assembly 12 may establish the virtual image corresponding to the arbitrary content, or the neck wearable assembly 12 may obtain the virtual image by loading rendered image data (e.g., reading from a local storage space, reading from a cloud storage space, reading from an external storage device locally accessed, etc.), or the neck wearable assembly 12 may also obtain the virtual image by other means, and the present disclosure does not limit it.

In an embodiment, the display device 1 can include a scene sensing module. The scene sensing module is configured to sense scene content viewed by the user, and send the scene content to the neck wearable assembly 12, to make the neck wearable assembly 12 to obtain the virtual image fitting to the scene content, thereby implementing a corresponding augmented reality function for the scene content. In this case, the display device 1 can be considered as an augmented reality device, which the present disclosure does not limit. For example, in embodiments illustrated in FIGS. 1-2, the optical imaging assembly 11 or the head-mounted assembly 13 may be provided with a camera. The camera is located near the eyes of the user, and can collect the scene content viewed by the user, the scene content can be sent to the neck wearable assembly 12 through the connection line 14 or wireless communication connection, such that the neck wearable assembly 12 can obtain the corresponding virtual image, and the virtual image can be presented to the user by the optical imaging assembly 11. In other embodiments, the scene sensing module may also adopt other structures, and the present disclosure does not limit it. For example, the scene sensing module may include a positioning chip and a gyroscope, the positioning chip can be configured to determine a geographic position of the user, and the gyroscope can be configured to determine an orientation of user's head, such that the scene viewed by the user can be determined.

In an embodiment, the display device 1 may include an instruction acquisition module. The instruction acquisition module is configured to collect an instruction issued by the user, and send the instruction to the neck wearable assembly 12, to make the neck wearable assembly 12 to perform a processing operation corresponding to the instruction. For example, the instruction acquisition module may include a sound receiver such as a microphone mounted on the optical imaging assembly 11, the neck wearable assembly 12 or the head-mounted assembly 13, and an instruction in a voice form issued by the user can be collected by the sound receiver to control the neck wearable assembly 12, such as switch control, volume adjustment, adjustment of the content of the virtual image, adjustment of a zoom ratio of the virtual image, etc., which are not limited by the present disclosure. In other embodiments, the instruction acquisition module may also adopt other structures, and the present disclosure does not limit it. For example, the instruction acquisition module may include a camera 15 as illustrated in FIGS. 1-2, the user's gesture action can be collected by the camera 15, and a corresponding instruction can be recognized based on the gesture action to control the neck wearable assembly 12.

In an embodiment, the neck wearable assembly 12 may include an operation response area. The operation response area is configured to respond to a trigger operation of the user to implement a corresponding operation function. For example, the operation function may include switch control, volume adjustment, adjustment of the content of the virtual image, adjustment of a zoom ratio of the virtual image, etc., which are not limited by the present disclosure. For example, as illustrated in FIGS. 1-2, the neck wearable assembly 12 may have a U shape. When the neck wearable assembly 12 is worn on the user's neck, a bottom of the U shape is located at a rear part of the user's neck, and two ends and an opening of the U shape are located at user's chest. Therefore, in order to facilitate user operation, the operation response area can be disposed at at least one end of the neck wearable assembly 12. For example, as illustrated in FIGS. 1-2, the operation response area is located at the left end of the neck wearable assembly 12. The operation response area may be provided with one or more trigger controls, such as a switch button 121, a volume up button 122, and a volume down button 123 illustrated in FIGS. 1-2. In addition to buttons, other types of trigger controls (such as knobs and touchpad) can be used, which all can be used to sense the trigger operation of the user, and the present disclosure does not limit it.

The volume adjustment mentioned above, corresponding to an audio play module built in the neck wearable assembly 12, can be configured to implement audio playback. In an embodiment, the neck wearable assembly 12 is provided with a speaker, to play audio to the user through the speaker. In another embodiment, the neck wearable assembly 12 is provided with an earphone jack, to play audio to the user through an earphone inserted into the earphone jack. In yet another embodiment, the neck wearable assembly 12 has a built-in wireless communication module, and the wireless communication module is coupled to a wireless earphone to play audio to the user through the wireless earphone. The neck wearable assembly 12 can support any one or more of the above audio playing modes, and the present disclosure does not limit it.

In an embodiment, such as the display device 1 illustrated in FIGS. 1-4, the head-mounted assembly 13 may include a lens 16 having a specific function. The lens 16 is located on the side of the optical imaging assembly 11 away from the user, such that the optical imaging assembly 11 is located between the lens 16 and the user's face. For example, the lens 16 may include a decorative lens for shielding the optical imaging assembly 11, thus enhancing aesthetics. As another example, the lens 16 may include a vision correction lens, such as a myopia lens or a hyperopia lens, to meet vision correction needs of users. As another example, the lens 16 may include an optical lens having preset characteristics, such as filtering out ultraviolet light, and the present disclosure does not limit the type of the preset characteristics. In order to meet user's needs in different scenarios, the lens 16 can be designed as a detachable structure, to facilitate the user to replace for different scenarios.

In an embodiment, the operation of the optical imaging assembly 11 is entirely dependent on the neck wearable assembly 12, such as power and the virtual image are all provided by the neck wearable assembly 12 to the optical imaging assembly 11. When the optical imaging assembly 11 is disconnected from the neck wearable assembly 12, or when the neck wearable assembly 12 fails to operate normally due to power exhaustion, the optical imaging assembly 11 may also fail to work normally. In another embodiment, the optical imaging assembly 11 may operate depending on the neck wearable assembly 12 under normal conditions, and under special conditions, the optical imaging assembly 11 may operate independently to some extent, thereby at least meeting part of use needs of users.

Figure 6:
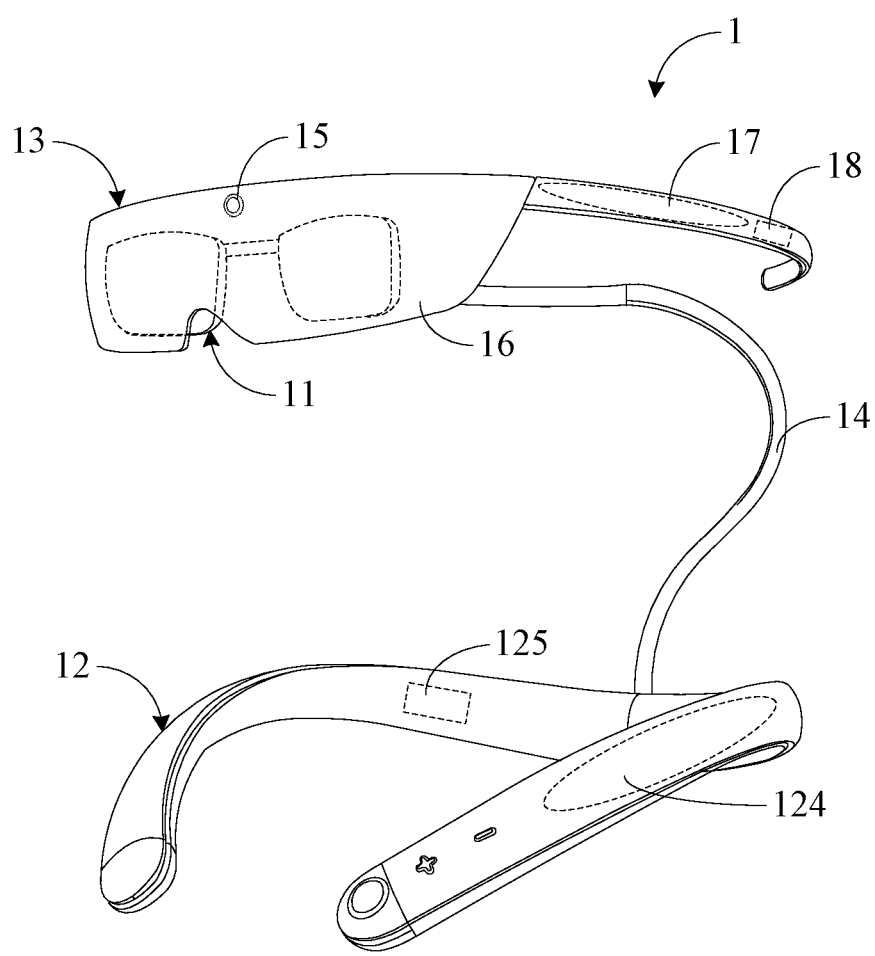
FIG. 6 is a schematic diagram illustrating a display device according to yet another exemplary embodiment.

For example, FIG. 6 is a schematic diagram of the display device 1 according to another exemplary embodiment. From a power supply point of view, as illustrated in FIG. 6, the neck wearable assembly 12 includes a built-in main power module 124, configured to supply power to the optical imaging assembly 11 under normal conditions, and the optical imaging assembly 11 or the head-mounted assembly 13 are provided with an auxiliary power module 17, configured to supply power to the optical imaging assembly 11 when the main power module 124 fails to supply power to the optical imaging assembly 11. The main power module 124 can directly supply power to the optical imaging assembly 11 under normal conditions, or the main power module 124 can supply power to the auxiliary power module 17, and the auxiliary power module 17 supplies power to the optical imaging assembly 11, the present disclosure does not limit it.

From a data processing point of view, as illustrated in FIG. 6, the neck wearable assembly 12 may include a main processing module 125, configured to obtain the virtual image and provide the virtual image to the optical imaging assembly 11, and the display device 1 may include an auxiliary processing module 18, built in the optical imaging assembly 11 or the head-mounted assembly 13, and configured to obtain a basic virtual image and provide the basic virtual image to the optical imaging assembly 11 for presenting when the main processing module 125 fails to provide the virtual image to the optical imaging assembly 11. The processing performance of the auxiliary processing module 18 is lower or far lower than the main processing module 125, the acquisition difficulty of the basic virtual image is lower than the virtual image, such that the auxiliary processing module 18 can provide the basic virtual image smoothly.

Since the processing performance of the auxiliary processing module 18 is low, the power consumption of the auxiliary processing module 18 is small, thus even when the auxiliary power module 17 has less power, it can still meet the application requirement of the auxiliary processing module 18. Therefore, it is possible to prevent the auxiliary power module 17 and the auxiliary processing module 18 from adding excessive load to the user's head, and it can also make the optical imaging assembly 11 operate independently of the neck wearable assembly 12 to some extent, thereby achieving a balance between the user's wearing comfort and function expansion.

Figure 7:
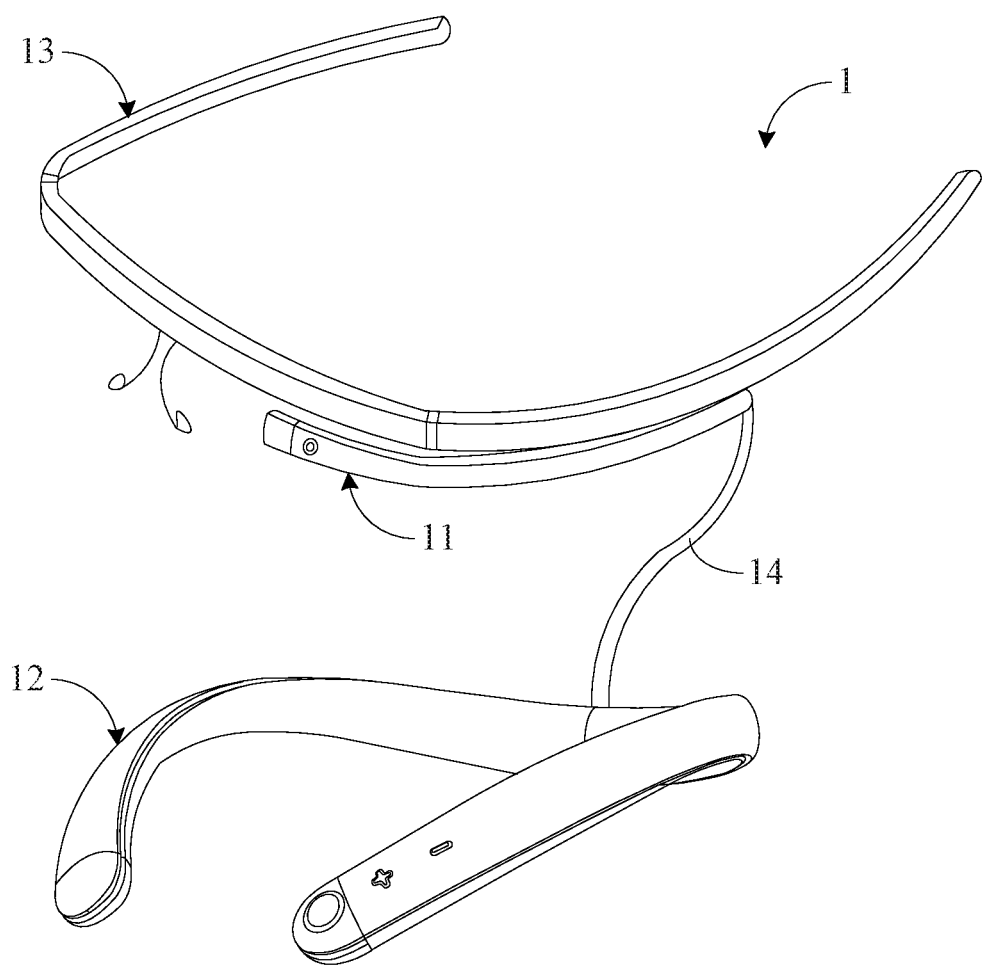
FIG. 7 is a schematic diagram illustrating a detachable display device according to an exemplary embodiment.

FIG. 7 is a schematic diagram illustrating a detachable display device according to an exemplary embodiment. As illustrated in FIG. 7, the display device 1 includes an optical imaging assembly 11 and a neck wearable assembly 12, and the optical imaging assembly 11 is mounted on a head-mounted assembly 13. The optical imaging assembly 11 and the head-mounted assembly 13 are independent of each other, in other words, the user can replace the head-mounted assembly 13 assembled with the optical imaging assembly 11 according to actual needs. For example, the user can assemble the optical imaging assembly 11 to multiple head-mounted assemblies, and can also share the optical imaging assembly 11 with other users, to assemble to other users' head-mounted assemblies.

Although in the display device 1 of the integrated structure illustrated in FIG. 1, the optical imaging assembly 11 is a binocular display assembly, and in the display device 1 of the split structure illustrated in FIG. 7, the optical imaging assembly 11 is a monocular display assembly, this is for illustrative purposes only. The binocular display assembly may be applied to the display device 1 of the split structure, and the monocular display assembly may be applied to the display device 1 of the integrated structure, which is not limited by the present disclosure.

In embodiments of the present disclosure, the optical imaging assembly 11 may adopt an arbitrary type of imaging structure in the related art, as long as it can present the virtual image to the user, and the present disclosure does not limit it.

For example, the optical imaging assembly 11 may adopt a projection principle, to project the virtual image onto the lens 16 illustrated in FIG. 1 (in embodiments illustrated in FIG. 7, the lens can also be assembled) for the user to view. As another example, the optical imaging assembly 11 may adopt a prismatic optical principle, to reflect the virtual image to the user's eye through the prism.

As another example, the optical imaging assembly 11 may adopt an optical waveguide and holographic technology, the virtual image is converted into parallel light through a collimating lens, the parallel light is directed to a first holographic grating after perpendicularly injecting into a planar waveguide, and under diffraction of the first holographic grating, full-reflection is achieved along the waveguide, the parallel light propagates to a second holographic grating, and then the second holographic grating directs the light parallel to the user's eye. As another example, the optical imaging assembly 11 may adopt a light field technology, to directly project light of the virtual image onto the user's retina through a fiber optic projector. In addition, other technology may be adopted, and can be applied to the optical imaging assembly 11 of the present disclosure, which are not enumerated here.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A display device, comprising:
a head-mounted assembly wearable on a user's head;
an optical imaging assembly, mounted on the head-mounted assembly, and configured to present a virtual image to the user when the user wears the head-mounted assembly on the user's head; and
a neck wearable assembly, wearable on the user's neck, and configured to obtain the virtual image and provide the virtual image to the optical imaging assembly for presenting,
wherein the neck wearable assembly includes different hard structures spatially separated from each other, and a deformable part is formed between adjacent hard structures,
wherein the deformable part is not provided with a hard structure inside, and an external wrapping structure of the deformable part is made of flexible material, such that the deformable part is adaptive to the user's neck curve, to achieve adaptive matching of the neck wearable assembly as a whole to the user's neck curve,
wherein the neck wearable assembly is configured to obtain the virtual image and provide the virtual image to the optical imaging assembly, and
wherein, when the neck wearable assembly fails to provide the virtual image to the optical imaging assembly, the optical imaging assembly is configured to obtain a basic virtual image for presenting, or the head-mounted assembly is configured to obtain the basic virtual image and to supply the basic virtual image to the optical imaging assembly for presenting, wherein acquisition difficulty of the basic virtual image is lower than acquisition difficulty of the virtual image.

2. The display device according to claim 1, wherein:
the optical imaging assembly is detachably mounted on the head-mounted assembly; or
the optical imaging assembly and the head-mounted assembly form an integrated structure.

3. The display device according to claim 1, further comprising:
a data connection line, coupled to the optical imaging assembly and the neck wearable assembly, to transmit the virtual image obtained by the neck wearable assembly to the optical imaging assembly.

4. The display device according to claim 3, wherein:
a first end of the data connection line is coupled to the optical imaging assembly, and a second end of the data connection line is coupled to the neck wearable assembly;
when the user wears the display device, the first end of the data connection line is located at or near a rear part of the user's head, and the second end of the data connection line is located at or near a rear part of the user's neck.

5. The display device according to claim 4, wherein:
the head-mounted assembly comprises a frame, the frame has a built-in transmission line, a first end of the transmission line is coupled to the optical imaging assembly, and a second end of the transmission line is coupled to the first end of the data connection line through an end of at least one temple on the frame.

6. The display device according to claim 1, wherein:
the optical imaging assembly comprises a first wireless communication module, the neck wearable assembly comprises a second wireless communication module, and a wireless communication connection is established between the first wireless communication module and the second wireless communication module;
the optical imaging assembly is configured to obtain the virtual image obtained by the neck wearable assembly through the wireless communication connection.

7. The display device according to claim 1, further comprising:
a power connection line, coupled to a main power module in the neck wearable assembly and the optical imaging assembly, to make the main power module to supply power to the optical imaging assembly.

8. The display device according to claim 7, further being configured to supply power to the optical imaging assembly when the main power module fails to supply power to the optical imaging assembly.

9. The display device according to claim 8, further being configured to supply power to an auxiliary power module through the power connection line.

10. The display device according to claim 1, wherein:
the neck wearable assembly has a U shape;
when the neck wearable assembly is worn on the user's neck, a bottom of the U shape is located at a rear part of the user's neck, and two ends and an opening of the U shape are located at the user's chest.

11. The display device according to claim 10, wherein:
at least one end of the neck wearable assembly is provided with an operation response area, and the operation response area is configured to respond to a trigger operation of the user, to implement a corresponding operation function.

12. The display device according to claim 11, wherein the operation response area is provided with at least one of a button, a knob, or a touch pad, to sense the trigger operation of the user.

13. The display device according to claim 1, wherein the shape of the neck wearable assembly is fitted to the user's neck curve; or
the shape of the neck wearable assembly is variable, to be adaptive to the user's neck curve when the neck wearable assembly is worn on the user's neck.

14. The display device according to claim 1, wherein the neck wearable assembly comprises:
a rear neck part, located at the rear part of the user's neck when the neck wearable assembly is worn on the user's neck;
a first front part, located at one side of the user's chest when the neck wearable assembly is worn on the user's neck;
a second front part, located at another side of the user's chest when the neck wearable assembly is worn on the user's neck;
a first deformable part, coupled between the rear neck part and the first front part, and adaptive to one side of the user's neck curve when the neck wearable assembly is worn on the user's neck; and
a second deformable part, coupled between the rear neck part and the second front part, and adaptive to another side of the user's neck curve when the neck wearable assembly is worn on the user's neck,
wherein the rear neck part, the first front part, and the second front part are configured to mount the hard structures, and
wherein the first deformable part and the second deformable part are not provided with hard structures inside, and external wrapping structures of the first deformable part and the second deformable part are made of flexible material, such that the first deformable part and the second deformable art are adaptive to the user's neck curve, to achieve adaptive matching of the neck wearable assembly as a whole to the user's neck curve.

15. The display device according to claim 1, further being configured to sense scene content viewed by the user, and send the scene content to the neck wearable assembly, to make the neck wearable assembly to obtain the virtual image fitting to the scene content.

16. The display device according to claim 1, further being configured to collect an instruction issued by the user, and send the instruction to the neck wearable assembly, to make the neck wearable assembly to perform a processing operation corresponding to the instruction.

17. The display device according to claim 1, wherein:
the neck wearable assembly is provided with a speaker, to play audio to the user through the speaker; or
the neck wearable assembly is provided with an earphone jack, to play audio to the user through an earphone inserted into the earphone jack; or
the neck wearable assembly is coupled to a wireless earphone to play audio to the user through the wireless earphone.

18. The display device according to claim 1, further comprising the head-mounted assembly, wherein the head-mounted assembly is provided with at least one of a decorative lens, a vision correction lens, or an optical lens having preset characteristics in the frame.

19. The display device according to claim 1, wherein the display device is an augmented reality display device.

* * * * *